(12) United States Patent
Greenrose

(10) Patent No.: US 6,461,523 B1
(45) Date of Patent: Oct. 8, 2002

(54) SOLIDS SEPARATION MECHANISM

(76) Inventor: John Greenrose, 2900 Arlington Rd., Louisville, KY (US) 40220

( * ) Notice: Subject to any disclaimer, the term of this patent is extended or adjusted under 35 U.S.C. 154(b) by 38 days.

(21) Appl. No.: 09/788,889

(22) Filed: Feb. 20, 2001

Related U.S. Application Data

(60) Provisional application No. 60/191,505, filed on Mar. 23, 2000.

(51) Int. Cl.[7] .......................... B01D 33/03; B01D 35/20; B01D 36/02; B01D 37/00
(52) U.S. Cl. .................. 210/770; 210/780; 210/785; 210/312; 210/388; 210/415; 100/37
(58) Field of Search ................................ 210/388, 770, 210/780, 389, 295, 299, 312, 415, 785; 100/37

(56) References Cited

U.S. PATENT DOCUMENTS

| | | |
|---|---|---|
| 3,188,942 A | 6/1965 | Wandel |
| 3,191,872 A | 6/1965 | Dyson |
| 3,319,897 A | 5/1967 | Craig et al. |
| 3,773,661 A * | 11/1973 | Talley .................. 210/388 |
| 3,943,033 A | 3/1976 | Wallén |
| 4,212,239 A | 7/1980 | Fraula et al. |
| 4,301,719 A | 11/1981 | Gerow |
| 4,651,636 A | 3/1987 | Fields |
| 5,413,703 A * | 5/1995 | Greenwald, Sr. ............ 210/205 |
| 6,279,471 B1 * | 8/2001 | Reddoch ...................... 100/37 |

FOREIGN PATENT DOCUMENTS

JP        06292995        10/1994

* cited by examiner

Primary Examiner—Robert J. Popovics
(74) Attorney, Agent, or Firm—Theresa Fritz Camoriano; Camoriano & Associates

(57) ABSTRACT

A mechanism and method for separating solids from a slurry includes a screen, and an extractor screw connected to the screen outlet by means of a flexible conduit, wherein the outlet of the extractor screw is at a higher elevation than the outlet of the screen.

6 Claims, 1 Drawing Sheet

SOLIDS SEPARATION MECHANISM

This application claims priority from and incorporates by reference U.S. Provisional Patent Application Ser. No. 60/191,505, filed Mar. 23, 2000.

BACKGROUND OF THE INVENTION

The present invention relates to an apparatus and method for solids separation. Various industrial processes involve a liquid waste stream that includes solids. It is often desirable to separate the solids from the waste stream in order to reduce disposal costs or to recover the solids for other uses. Various filtration and other separation mechanisms are known and have been used for this purpose. For example, U.S. Pat. No. 4,651,636 "Fields" shows a type of screw extractor. Also, SWECO makes a vibrating. screen which concentrates the; solids in a liquid stream.

SUMMARY OF THE INVENTION

The present invention greatly improves over these prior art mechanisms, achieving a through-put that is two to four times as great as what has been achieved in the prior art at essentially the same cost.

The present invention achieves this tremendously-improved result by modifying and connecting together previously-known components in a new way. In the preferred embodiment of the present invention, a vibratory screen separator is connected to an extractor screw by means of a flexible tube. This arrangement creates a head in the vibratory screen separator, which greatly improves the throughput in the vibratory screen separator.

DESCRIPTION OF THE PREFERRED EMBODIMENT

Figure 1:
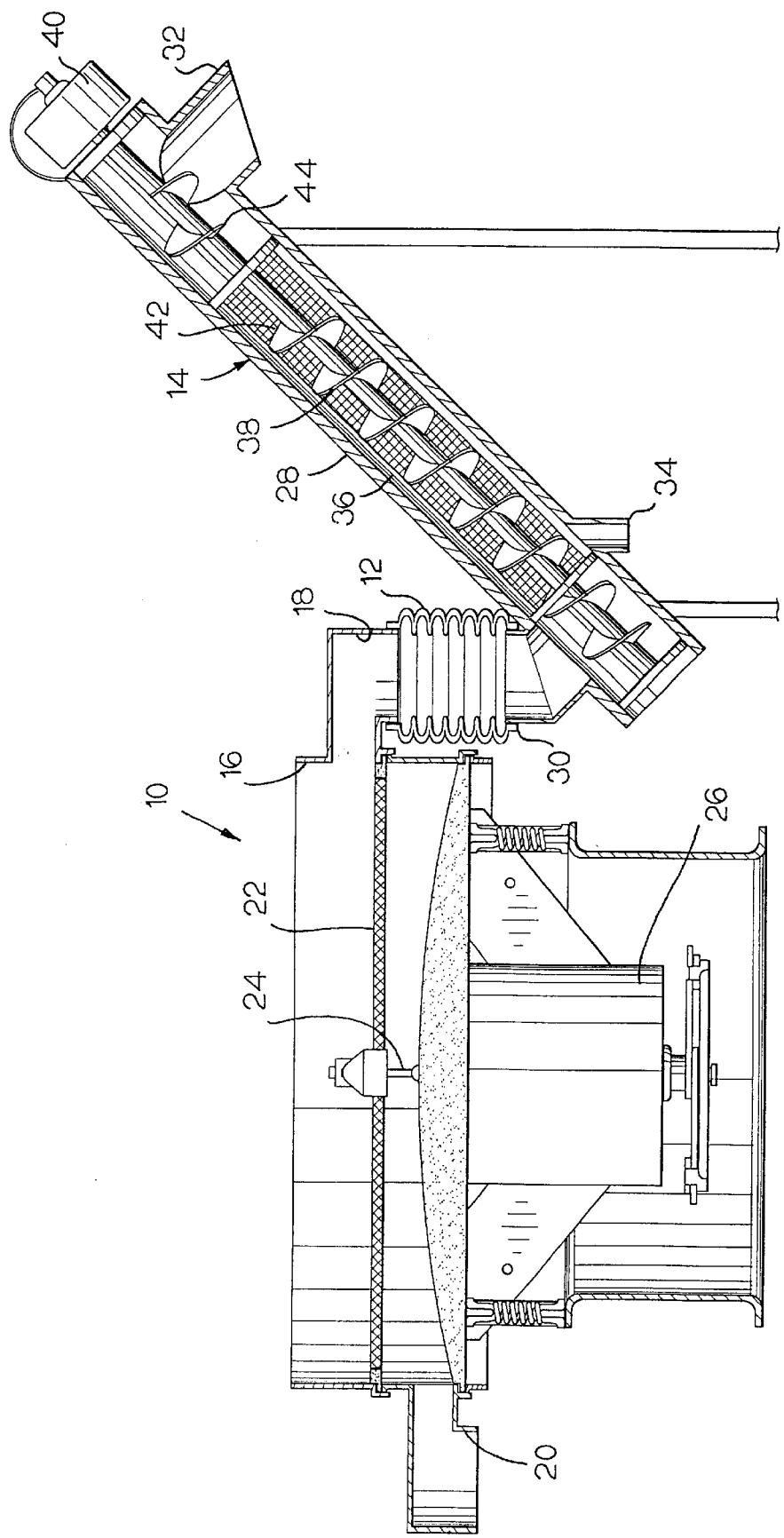
FIG. 1 is a sectional view through a separation arrangement made in accordance with the present invention.

As shown in FIG. 1, the assembly includes a vibrating screen separator 10, which is connected by a flexible tube or boot 12 to an extractor screw 14. In this preferred embodiment, the vibrating screen separator 10 is a SWECO model US60C88, but other screen separators with a substantially horizontal screen could also be used.

The separator 10 has an open top 16, which serves as an inlet to receive the slurry to be separated. It has a concentrated solids outlet 18, and a liquid outlet 20. A circular screen 22 is located between the inlet 16 and the liquid outlet 20, and the screen 22 is mounted on the frame along its perimeter and by means of a shaft 24. The motor 26 imparts a vibratory motion to the upper frame and the screen 22, so that solids tend to migrate to the outside edge of the screen 22 and fall into the concentrated solids outlet 18, while liquid passes through the screen 22 to the liquid outlet 20. In early tests, the machine was used to separate potato fiber from water in the waste water stream from a potato chip processing plant, but many other types of slurries could also take advantage of this arrangement.

The flexible conduit 12 is clamped to the concentrated solids outlet 18 of the vibrating screen separator 10 and to the inlet 30 of the screw extractor 14, providing a flexible, sealed conduit from the vibratory screen solids outlet 18 to the screw extractor inlet 30. Since the conduit 12 is flexible, it isolates the screw extractor 14 from the vibration of the screen separator 10, and, since it is sealed to the outlet 18 and to the inlet 30, it permits the head of liquid in the screw separator 14 to back up into the screen separator 10 to form a head of liquid in the vibratory screen separator 10 above the screen 22. This head of liquid greatly improves the performance of the vibratory screen separator 10 over its normal performance.

The screw extractor 14 has a housing 28, which defines the inlet 30, the concentrated solids outlet 32, and the liquid outlet 34. In a preferred embodiment, the liquid outlet 34 of the screw extractor 14 is fed by a hose (not shown) back to the inlet 16 of the vibratory screen separator. Inside the cylindrical housing 28 is a perforated cylinder or screen 36, and inside the screen 36 is an auger 38, which, is driven by a drive motor 40. The screw extractor 14 preferably is mounted at an angle as shown, with the inlet 30 of the screw extractor 14 below the outlet 18 of the vibratory screen separator 10 and the concentrated solids outlet 32 of the screw extractor located above the outlet 18 from the screen separator 10.

The slurry that enters the screw extractor 14 through its inlet 30 is carried upwardly by the rotating auger 38. As it is carried upwardly, liquid is pressed through the perforated cylinder 36 and leaves the housing 28 through the liquid discharge 34, from which it may leave the separation system or may be fed back to the inlet 16 of the screen separator 10. The flights of the screw or auger 38 terminate at a point 42 below the top of the screen and then begin again at the point 44, leaving a gap, so that a plug of solids forms within the gap area between the points 42 and 44, helping to press liquid out of the solids. The flights of the auger 38 may include brush bristles along their outer edge to brush material along the surface of the screen or perforated cylinder 36 to prevent the holes from plugging.

In a test set-up, a six-inch diameter extractor 14 was used, and the elevation of the outlet 32 was arranged to be 8–12 inches above the elevation of the screen 22. This caused the extractor 14 to raise the water level in the vibrating separator 10 to an elevation of approximately 2–4 inches above the screen 22. The flexible tube or boot 12 provides an enclosed path from the outlet 18 to the inlet 30, while isolating the extractor screw 14 from the vibration. When this arrangement was tested for separating potato solids, a 100–300 gallon feed to the SWECO vibratory separator at a very low concentration of solids was concentrated to 28% solids at the outlet 32 of the extractor screw 14 at a rate of approximately three cubic yards of solids per hour. This is a far greater capacity than can be achieved by prior art arrangements in which the vibratory screen separator feeds the extractor screw through an open hopper. It is believed that the, increased. throughput is due to the liquid head above the screen 22. If the slurry leaving the outlet 18 were simply to pass out of the system, without backing up, there is only a slight liquid level above the screen 22. However, when the outlet 18 is connected by a boot to a device such as the screw extractor 14, that removes the solids while maintaining a head on the vibratory screen 10, there are two-to-four inches of liquid above the screen 22. This liquid level above the screen 22 causes the screen 22 to operate in a very different, more productive manner.

The height of the outlet 32 above the screen 22 may be varied, depending upon the sizes of the screen and extractor and depending upon the type of slurry involved. The relative heights should be selected so that a head of slurry is formed above the screen 22. Again, the height of the head may be varied depending upon the nature of the slurry, but, for the potato slurry, a head of 2–4 inches was very effective. It is thought that a similar head will also prove to be very effective for a wide range of other types of slurries.

It will be obvious to those skilled in the art that modifications may be made to the embodiments described above without departing from the scope of the present invention.

What is claimed is:

1. A mechanism for separating solids from a slurry, comprising:

a substantially horizontal vibratory screen at a first elevation; a housing surrounding the screen and defining an inlet above the screen, a concentrated solids outlet at approximately the elevation of the screen, and a liquid outlet below the screen;

an extractor screw housing having an inlet, a concentrated solids outlet located at a higher elevation than the screen, and an auger inside the housing; and a flexible conduit connecting the concentrated solids outlet of the screen and the inlet of the extractor screw so as to provide an enclosed path between the concentrated solids outlet of the screen and the inlet of the extractor screw.

2. A mechanism for separating solids from a slurry as recited in claim 1, wherein the concentrated solids outlet of the extractor screw housing is at least six inches above the substantially horizontal screen.

3. A mechanism for separating solids from a slurry as recited in claim 2, wherein said auger defines a gap near its uppermost end for forming a solids plug.

4. A mechanism for separating solids from a slurry as recited in claim 3, wherein said auger has an axis of rotation at an angle to the vertical.

5. A mechanism for separating solids from a slurry as recited in claim 4, wherein the liquid outlet of the screw extractor is fed to the inlet of the screen, so that substantially all the liquid leaving the mechanism leaves through the liquid outlet of the screen and substantially all the solids leaving the mechanism leave through the concentrated solids outlet of the screw extractor.

6. A method for improving the performance of a vibrating screen separator, comprising the step of restricting the flow of liquid from the solids outlet of the screen separator to form a liquid head above the screen, wherein said flow of liquid from the solids outlet is restricted by connecting the solids outlet of the vibrating screen separator to the inlet of a screw extractor by a closed conduit, so that the screw extractor removes the solids from the solids outlet of the screen separator while creating a liquid head.

* * * * *

UNITED STATES PATENT AND TRADEMARK OFFICE
CERTIFICATE OF CORRECTION

PATENT NO. : 6,461,523 B1
DATED : October 8, 2002
INVENTOR(S) : John Greenrose

It is certified that error appears in the above-identified patent and that said Letters Patent is hereby corrected as shown below:

Column 1,
Line 18, following the words "concentrates the" delete ";".

Column 2,
Line 13, following the word "which" delete ",".
Line 49, following the word "the" delete ",".
Line 50, following the word "increased" delete ".".

Signed and Sealed this

Eighteenth Day of February, 2003

JAMES E. ROGAN
*Director of the United States Patent and Trademark Office*